United States Patent
Martin et al.

(10) Patent No.: US 9,677,448 B2
(45) Date of Patent: Jun. 13, 2017

(54) METHOD AND SYSTEM FOR REDUCING ENGINE EXHAUST EMISSIONS

(71) Applicant: Ford Global Technologies, LLC, Dearborn, MI (US)

(72) Inventors: Douglas Raymond Martin, Canton, MI (US); Kenneth James Miller, Canton, MI (US); Michiel J. Van Nieuwstadt, Ann Arbor, MI (US); John Eric Rollinger, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 14/689,309

(22) Filed: Apr. 17, 2015

(65) Prior Publication Data

US 2016/0305302 A1 Oct. 20, 2016

(51) Int. Cl.
| | | |
|---|---|---|
| *F01N 3/00* | (2006.01) | |
| *F01N 3/30* | (2006.01) | |
| *F01N 3/021* | (2006.01) | |
| *B01D 53/94* | (2006.01) | |
| *F01N 3/32* | (2006.01) | |
| *F01N 9/00* | (2006.01) | |

(52) U.S. Cl.
CPC ............... *F01N 3/30* (2013.01); *B01D 53/94* (2013.01); *F01N 3/021* (2013.01); *F01N 3/306* (2013.01); *F01N 3/323* (2013.01); *F01N 9/002* (2013.01); *F01N 2240/28* (2013.01); *F01N 2430/06* (2013.01); *F01N 2550/14* (2013.01); *F01N 2900/1602* (2013.01)

(58) Field of Classification Search
CPC . F01N 3/30; F01N 3/021; F01N 3/323; F01N 9/002; B01D 53/94
USPC .......................................................... 60/285
See application file for complete search history.

(56) References Cited

U.S. PATENT DOCUMENTS

| | | | |
|---|---|---|---|
| 5,913,809 A | * | 6/1999 | Erlichman ............. F02M 25/12 60/272 |
| 7,121,079 B2 | | 10/2006 | Calvo et al. |
| 7,331,170 B2 | | 2/2008 | Shimoda |
| 8,776,498 B2 | | 7/2014 | Gandhi et al. |
| 2010/0058742 A1 | * | 3/2010 | Hirata ................ B01D 53/9454 60/286 |

(Continued)

FOREIGN PATENT DOCUMENTS

FR 2877588 A1 * 5/2006 ......... B01D 53/9431

OTHER PUBLICATIONS

Martin, D. et al., "Method and System for Gas Particulate Filter," U.S. Appl. No. 14/540,307, filed Nov. 13, 2014, 50 pages.

(Continued)

*Primary Examiner* — Jason Shanske
(74) *Attorney, Agent, or Firm* — Julia Voutyras; McCoy Russell LLP

(57) ABSTRACT

Methods and systems are provided for addressing engine cold-start emissions while an exhaust catalyst is activated. In one example, a method for improving exhaust emissions may include flowing ionized air into an engine exhaust, downstream of an exhaust catalyst, to oxidize exhaust emissions left untreated by the catalyst. The approach reduces the PM load of the exhaust as well as of a downstream particulate matter filter.

14 Claims, 4 Drawing Sheets

(56) References Cited

U.S. PATENT DOCUMENTS

| | | | |
|---|---|---|---|
| 2010/0132337 A1* | 6/2010 | Hirata | B01D 46/42 |
| | | | 60/286 |
| 2010/0221164 A1* | 9/2010 | Lee | B01D 53/90 |
| | | | 423/239.2 |
| 2013/0138326 A1 | 5/2013 | Andersson | |
| 2013/0312407 A1 | 11/2013 | Surnilla et al. | |
| 2014/0000246 A1* | 1/2014 | Hosoya | B01D 53/90 |
| | | | 60/286 |
| 2014/0286827 A1* | 9/2014 | Kawada | B01D 53/22 |
| | | | 422/108 |

OTHER PUBLICATIONS

Martin, D. et al., "Engine Refurbishment Using Ionized Air," U.S. Appl. No. 14/632,856, filed Feb. 26, 2015, 36 pages.

"The future is plasma: Customized Surface Treatment with Atmospheric Pressure Plasma Systems," Plasmatreat USA, Inc., http://www.plasmatreat.com/, Accessed Jun. 19, 2015, 1 page.

* cited by examiner

METHOD AND SYSTEM FOR REDUCING ENGINE EXHAUST EMISSIONS

FIELD

The present description relates generally to methods and systems for reducing engine cold-start exhaust emissions as well as particulate matter emissions.

BACKGROUND/SUMMARY

Engine out cold-start emissions generated before light-off of an exhaust system emission control device (e.g., a catalytic converter) may contribute a large percentage of the total exhaust emissions. Various approaches may be used by engine control systems to expedite the attainment of the catalyst light-off temperature. For example, expensive electric catalyst heaters may be used to generate the heat. As another example, various combinations of spark timing retard, valve overlap, and increased fuel injection may be used to expedite catalyst warming.

In another approach shown by Shimoda in U.S. Pat. No. 7,331,170, a plasma generator is coupled to an emission control device, downstream of an oxidation catalyst and upstream of a diesel particulate filter. Electricity is discharged by the plasma generator into the exhaust flow to maintain the operating temperature of the particulate filter in a target operating region.

However, the inventors herein have recognized a potential issue with such a system. Since the electrodes of the plasma generator are themselves exposed to exhaust gas flow, soot and particulates get entrained and accumulated on the electrodes. This can cause leakage of current, making it difficult for a voltage to be applied across the electrodes of the plasma generator, and hindering the further generation of plasma. To address this issue, Shimoda requires fuel to be periodically added upstream of the oxidation catalyst. The resulting heat generated at the oxidation catalyst provides sufficient heat to burn off the soot accumulated on the plasma generator. However, the need to add fuel and periodically regenerate the plasma generator results in degraded fuel economy. In addition, while the generation of plasma addresses the temperature requirement of the filter, the temperature requirement of other emission control devices coupled in the exhaust may remain unmet. As a result, exhaust emissions may still be non-compliant. As another example, with the upstream addition of ionized air, the engine may need to run rich to maintain the exhaust catalyst at stoichiometry, thereby degrading fuel economy.

The inventors herein have recognized that cold-start emissions may be better addressed by converting the cold-start hydrocarbons using an ionized air stream while an emission control device is cold instead of (or in addition to) focusing on expediting light-off of the emission control device during the cold-start. The use of ionized air may provide lower overall emissions that can be implemented in multiple engine configurations, including engines operating with different fuels (e.g., gasoline or diesel) as well as different fuel injection types (e.g., port or direct injection) with minimal interference with existing engine cold-start controls. In addition, by addressing the exhaust soot using the ionized air, the need for particulate filters may be reduced.

Thus, in one example, cold-start engine emissions may be addressed by a method for an engine comprising: introducing ionized air downstream of an exhaust catalyst responsive to catalyst temperature. In this way, ionized air may be used to burn off cold-start emissions until an exhaust catalyst is activated.

As one example, during an engine cold-start, while an exhaust catalyst warms up, cold-start emissions may be oxidized as they are generated using ionized air. Ionized air may be flowed downstream of the exhaust catalyst so that exhaust emissions left untreated by the catalyst can be addressed using the ionized air. For example, ionized airflow may be delivered so that a threshold fraction of aircharge received downstream of the exhaust catalyst is provided as ionized air. The flow of ionized air may be accompanied by spark retard, at a less aggressive clip, to expedite catalyst heating. In addition, rich engine operation may be limited while ionized air is flowed so as to protect against component overheating. Ionized air may continue to be delivered until the exhaust catalyst is activated, after which time the ionized air flow may be terminated. In addition to adjusting the ionized airflow responsive to catalyst temperature, the ionized airflow may also be adjusted based on exhaust particulate matter load. For example, ionized air may be flowed during tip-ins, in anticipation of a rise in exhaust soot load.

In this way, cold start emissions can be addressed as they are generated without needing to expedite catalyst heating using aggressive spark retard or dedicated catalyst heaters. This allows exhaust emissions to be reduced without requiring precious metal loading on exhaust catalysts. This reduces catalyst costs and complexity. By reducing the need for aggressive spark retard during cold-starts, NVH issues associated with aggressive spark retard, such as intake rumble from a near wide open throttle during the spark retard, can be reduced, improving drive quality. By introducing the air downstream of the exhaust catalyst (e.g., an oxidation catalyst or a three-way catalyst), the catalyst can warm up near stoichiometry. This allows the ionized air to oxidize the residual hydrocarbons without generating NOx at the exhaust catalyst. In this way, the introduction of ionized air downstream of the exhaust catalyst allows emissions reduction benefits to be achieved during an engine cold-start. It will be appreciated that in alternate examples, the ionized air may be introduced upstream of the exhaust catalyst. In such an embodiment, in addition to emission reduction benefits, heating benefits may also be realized. Specifically, with upstream introduction of ionized air, to maintain the three-way catalyst at stoichiometry, the engine would need to run rich to balance the ionized air stream. While this may expedite catalyst heating, fuel economy may be affected.

In hybrid vehicles, the use of ionized air also can provide the opportunity to delay engine pull-ups to a colder catalyst temperature. By also using ionized air to reduce exhaust PM emissions during cold-starts, as well as other conditions where exhaust soot levels are elevated, particulate matter filter life can be extended. Overall, the impact on fuel economy is improved while reducing exhaust emissions.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
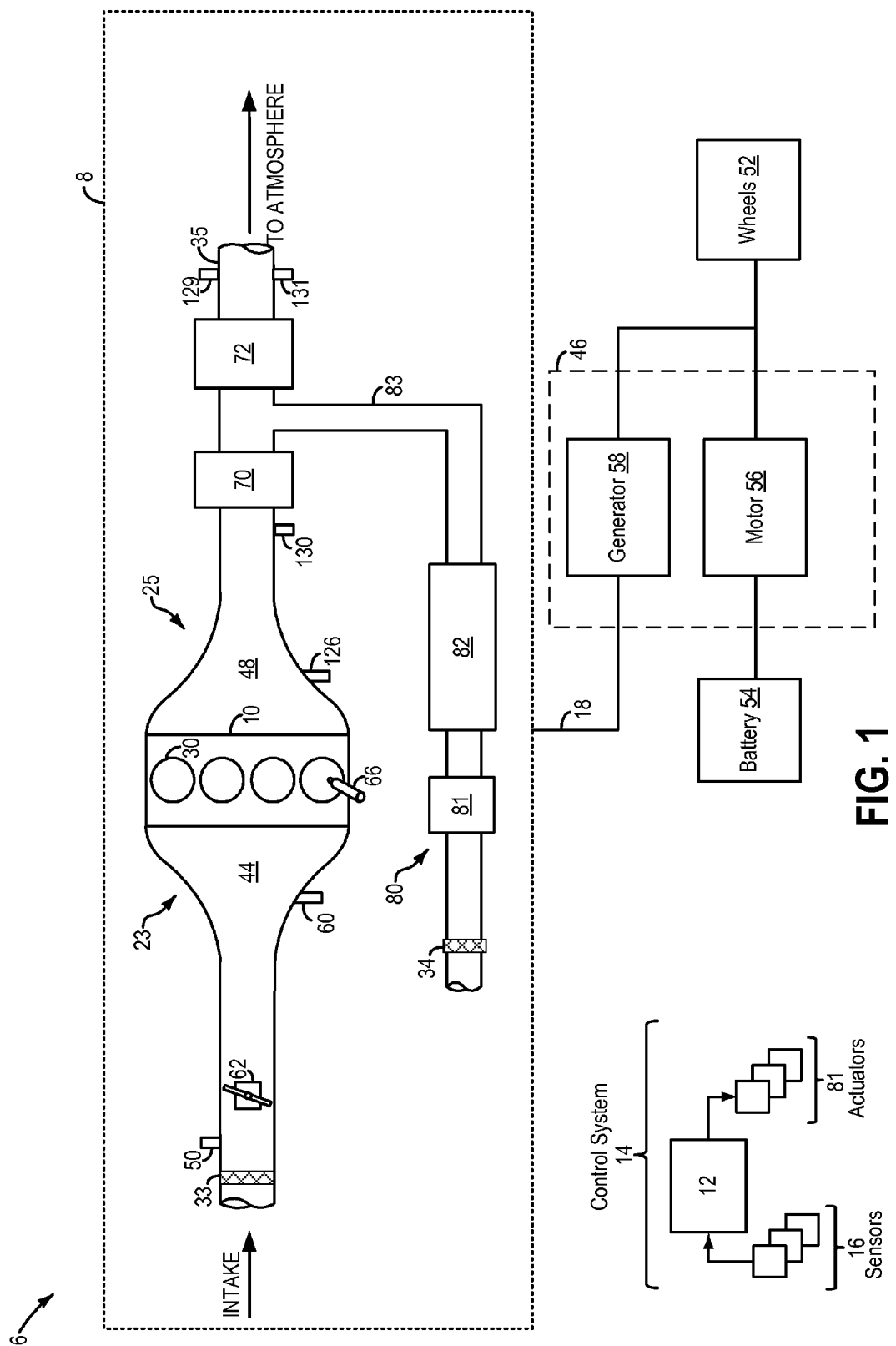
FIG. 1 shows an example hybrid electric vehicle system.
Figure 2:
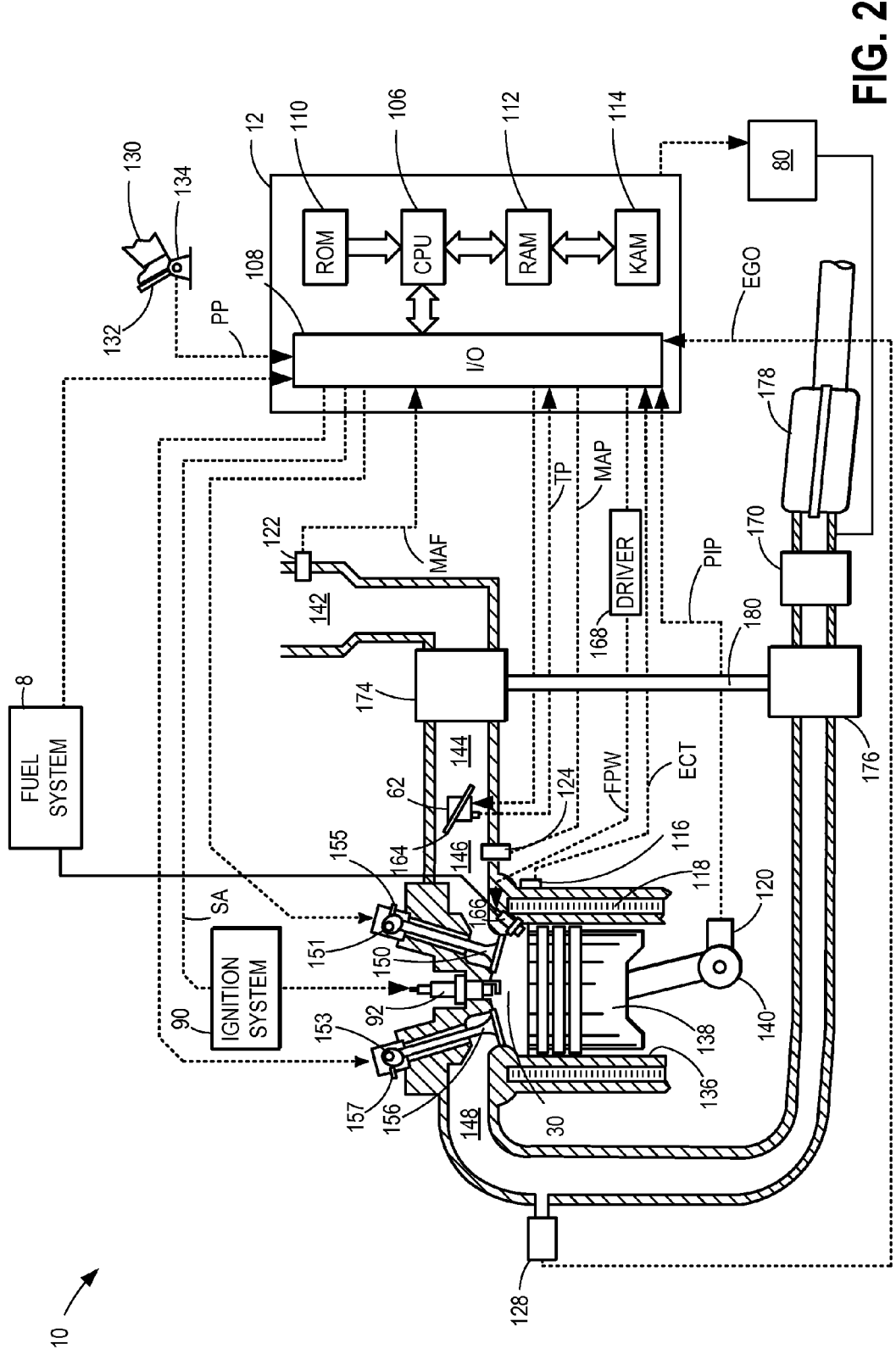
FIG. 2 shows an example internal combustion engine configured with an ionized air source.

Methods and systems are provided for addressing cold-start emissions and particulate matter emissions from an engine system coupled in a vehicle, such as the system of FIGS. 1-2, using ionized air. An engine controller may be configured to perform a control routine, such as the example routine of FIG. 3, to stream ionized air into an engine exhaust, downstream of an exhaust oxidation catalyst and upstream of an exhaust particulate filter, based at least on catalyst temperature. Cold-start emissions that are not oxidized by the oxidation catalyst are oxidized by the ionized air, reducing exhaust emissions. In addition, during other conditions when particulate matter (PM) emissions from the engine is higher, ionized air may be used to reduce PM emissions, thereby reducing the reliance on an exhaust particulate filter. Organic matter oxidized by the ionized air may then be expelled through the exhaust tailpipe. An example cold-start operation is shown with reference to FIG. 4. In this way, engine exhaust emissions compliance can be improved.

FIG. 1 depicts a hybrid propulsion system 6 for a vehicle. In the depicted embodiment, the vehicle is a hybrid electric vehicle (HEV) that can derive propulsion power from engine system 8 and/or an on-board energy storage device (not shown). In alternate embodiments, propulsion system 6 may only derive propulsion power from engine system 8. Engine system 8 includes an internal combustion engine 10 having a plurality of cylinders 30. Fuel may be provided to each cylinder of engine 10 from a fuel system (not shown) including one or more fuel tanks, one or more fuel pumps, and injectors 66.

Engine system 8 may include an engine 10 having a plurality of cylinders 30. In the present example, engine 10 is a spark-ignition engine of a vehicle. Combustion events in each cylinder drive a piston which in turn rotates a crankshaft, as is well known to those of skill in the art. Further, engine 10 may include a plurality of engine valves for controlling the intake and exhaust of gases in the plurality of cylinders.

Engine 10 includes an engine intake 23 and an engine exhaust 25. Engine intake 23 includes a main air intake throttle 62 fluidly coupled to the engine intake manifold 44 via an intake passage 42. Air may enter intake passage 42 from an air intake system including an air filter 33 in communication with the vehicle's environment. A position of main throttle 62 may be varied by controller 12 via a signal provided to an electric motor or actuator included with the main throttle 62, a configuration that is commonly referred to as electronic throttle control. In this manner, throttle 62 may be operated to vary the intake air provided to the intake manifold.

In the example embodiment shown in FIG. 1, mass air flow (MAF) sensor 50 is coupled in intake passage 42 for providing signals regarding mass air flow in the intake passage to controller 12. In the depicted example, MAF sensor 50 provides a signal regarding mass air flow at the inlet of intake passage 42, upstream of air filter 33. However, it will be appreciated that the MAF sensors may be coupled elsewhere in the intake system or engine system, and further, there may be a plurality of MAF sensors arranged in the intake system or engine system.

A sensor 60 may be coupled to intake manifold 44 for providing a signal regarding manifold air pressure (MAP) and/or manifold vacuum (MANVAC) to controller 12. For example, sensor 60 may be a pressure sensor or a gauge sensor reading vacuum, and may transmit data as negative vacuum (e.g., pressure) to controller 12. In some examples, additional pressure/vacuum sensors may be coupled elsewhere in the engine system to provide signals regarding pressure/vacuum in other areas of the engine system to controller 12. These may include, for example, a sensor coupled to intake passage 42 upstream of the compressor, for providing a signal regarding barometric pressure (BP), a compressor inlet pressure (CIP) sensor arranged upstream of the compressor, etc.

In the depicted embodiment, engine system 8 does not include a boosting device and operates with natural aspiration. However, in alternate embodiments, as shown with reference to FIG. 2, engine system 8 may be a boosted engine system including a boosting device in the form of a compressor. The compressor may be, for example, the compressor of a turbocharger, wherein compressor is coupled to and driven by an exhaust turbine via a shaft. Further, the compressor may be, at least in part, driven by an electric motor or the engine crankshaft. In alternate embodiments, the boosting device may be a compressor of a supercharger wherein the compressor is driven only by the electric motor. When included, the compressor is configured to boost an intake air charge received along intake passage 42.

Engine exhaust 25 includes an exhaust manifold 48 leading to an exhaust passage 35 that routes exhaust gas to the atmosphere. Engine exhaust 25 may include one or more emission control devices mounted in a close-coupled position. The one or more emission control devices may include, for example, oxidation catalyst 70 and particulate matter (PM) filter 72. In the depicted embodiment, oxidation catalyst 70 is positioned upstream of particulate matter (PM) filter 72. Other emission control devices coupled to the exhaust may include a three-way catalyst, lean NOx trap, selective reduction catalyst, etc.

When the engine is started under cold ambient conditions, or when the engine is started after a sufficiently long period of being shutdown (e.g., while the vehicle was being propelled via the motor or while the vehicle was shutdown), the exhaust catalyst (e.g., the oxidation catalyst or catalytic converter) may be at a temperature lower than its activation temperature (also known as the light-off temperature). As such, engine out cold-start emissions generated before light-off of the exhaust catalytic converter contribute a large percentage of the total exhaust emissions. To reduce these emission, engine control systems use various approaches to expedite heating of the catalyst and attainment of the catalyst light-off temperature. For example, expensive electric catalyst heaters may be used to generate heat locally at the catalyst. As another example, various combinations of spark timing retard, valve overlap, and increased fuel injection may be used to raise exhaust temperature and thereby expedite catalyst warming. However, such approaches can degrade vehicle fuel economy and performance. The inventors herein have recognized that engine out cold-start emissions can be addressed without degrading fuel economy using ionized air (also referred to as ionic air). As elaborated herein with reference to FIG. 3, ionized air may be introduced into the engine exhaust, downstream of the exhaust catalyst so that any exhaust emissions (including organic matter and particulate matter) that go untreated by the exhaust catalyst can be oxidized by the ionized air. The oxidation improves the quality of exhaust emissions.

In addition to cold-start conditions, during other engine operating conditions where the exhaust PM level is expected (or estimated) to be high, such as during an operator pedal tip-in (e.g., to wide open throttle), the introduction of ionized air can reduce the soot load of the exhaust, thereby improving exhaust emissions and reducing the dependency for soot filtering on a downstream exhaust PM filter. In one example, the need for an exhaust PM filter may be obviated, providing component reduction benefits. In still other examples, such as where the PM filter is included, ionized air can also be introduced during conditions when the PM load of the PM filter necessitates filter regeneration. By introducing ionized air during these conditions, the PM filter can be regenerated without requiring lean engine operation and at significantly lower exhaust temperatures than would otherwise be possible. Further still, a deceleration fuel shut-off (DFSO) event would not be required to complete the regeneration of the PM filter.

When required, ionized air may be introduced into engine exhaust 25, downstream of oxidation catalyst 70 and upstream of PM filer 72, via conduit 83 by ionized air system 80. Ionized air system 80 includes electric air pump 81 and ionizer 82. Specifically, to introduce the ionized air, electric air pump 81 may be operated to draw fresh air into conduit 83 through air filter 34. An output of air pump 81 may be adjusted based on the amount of aircharge expected at exhaust catalyst 70 from engine intake 23 so that a threshold portion (e.g., 15%) of the total aircharge received downstream of the catalyst can be replaced with ionized air from the air pump 81. In addition to operating air pump 81, ionizer 82 may be operated to ionize the air pumped into conduit 83 by pump 81. In one example, the power setting of ionizer 82 may be adjusted so that a threshold (or predefined) portion (e.g., 20%) of the airflow received downstream of the exhaust catalyst is ionized. In some examples, when ionized air is to be flowed into the exhaust, controller 12 may coordinate the power setting of ionizer 82, and the flow rate of air pump 81 with the opening of intake throttle 62 so as to provide ionized air at a target ratio (of aircharge) and a target level of ionization.

As such, matter changes its state when energy is supplied to it, specifically, scuds become liquid, and liquids become gaseous. If even more energy is supplied to a gas, it is ionized and goes into the energy-rich plasma state. A plasma (or ionized air) can be created by heating a gas (such as ambient air) or subjecting the gas to a strong electromagnetic field applied with a generator (such as a laser or microwave generator). This decreases or increases the number of electrons, creating positive or negative charged particles or ions, and is accompanied by the dissociation of molecular bonds, if present. Thus ionizer 82 may use electrostatically charged plates to produce positively or negatively charged gas ions (for instance $N_2^-$ or $O_2^-$) that organic and particulate matter sticks to in an effect similar to static electricity. In one example, the ionizer may provide an ionized air stream using a 20,000V electric source. For example, ionized air may include air in which the oxygen content has been given an electrical charge, which may include a negative charge due to the presence of one or more extra electrons per oxygen molecule, or a positive charge due to the presence of less than the normal number of electrons per molecule. It will be appreciated that the ionized air (herein also referred to as ionic air or plasma) generated by ionizer 82 may be distinct from ozone (which includes a triple bonded molecule of oxygen). The ionizer (or plasma generator or ionized air source) may use charged electrical surfaces or needles to generate electrically charged air or gas ions. These ions may attach to particulate matter which are then oxidized or electrostatically attracted to a charged collector plate. The ionizer may be fan-less or fan-based. In one example, the ionizer may include a plasma source, such as the "Openair" (trademark) Plasma Surface Preparation System (made by Plasmatreat, 2541 Technology Drive, Elgin, Ill. 60124).

Engine 10 delivers power to a transmission 46 via torque input shaft 18. In one example, transmission 46 is a power-split transmission (or transaxle) that includes a planetary gearset and one or more rotating gear elements. Transmission 46 further includes an electric generator 58 and an electric motor 56. The electric generator 58 and the electric motor 56 may also be referred to as electric machines as each may operate as either a motor or a generator. Torque is output from transmission 46, for propelling vehicle tractions wheels 52, via a power transfer gearing (not shown), a torque output shaft 19, and a differential-and-axle assembly (not shown).

Generator 58 is drivably connected to electric motor 56 such that each of electric generator 58 and electric motor 56 may be operated using electric energy from an electrical energy storage device, herein depicted as battery 54. In some embodiments, an energy conversion device, such as an inverter, may be coupled between the battery and the motor to convert the DC output of the battery into an AC output for use by motor. However, in alternate embodiments, the inverter may be configured in the electric motor.

Electric motor 56 may be operated in a regenerative mode, that is, as a generator, to absorb energy from vehicle motion and/or the engine and convert the absorbed kinetic energy to an energy form suitable for storage in battery 54. Furthermore, electric motor 56 may be operated as a motor or generator, as required, to augment or absorb torque provided by the engine, such as during a transition of engine 10 between different combustion modes (e.g., during transitions between a spark ignition mode and a compression ignition mode).

Hybrid propulsion system 6 may be operated in various embodiments including a full hybrid system, wherein the vehicle is driven by only the engine and generator cooperatively, or only the electric motor, or a combination. Alternatively, assist or mild hybrid embodiments may also be employed, wherein the engine is the primary source of torque and the electric motor selectively adds torque during specific conditions, such as during a tip-in event.

Propulsion system 6 may further include control system 14. Control system 14 is shown receiving information from a plurality of sensors 16 (various examples of which are described herein and with reference to FIG. 2) and sending control signals to a plurality of actuators 81 (various examples of which are described herein and with reference to FIG. 2). As one example, sensors 16 may include exhaust gas sensor 126 located upstream of the emission control device, exhaust temperature sensor 128, exhaust pressure sensor 129, MAP sensor 60, and MAF sensor 50. Other sensors such as additional pressure, temperature, air/fuel ratio, and composition sensors may be coupled to various locations in the propulsion system 6. As another example, the actuators may include fuel injector 66, throttle 62, air pump 81, and ionizer 82. The control system 14 may include a controller 12. The controller may receive input data from the various sensors, process the input data, and trigger the actuators in response to the processed input data based on instruction or code programmed therein corresponding to one or more routines. The controller 12 receives signals from the various sensors of FIG. 1 (and FIG. 2) and employs the various actuators of FIG. 1 (and FIG. 2) to adjust vehicle operation based on the received signals and instructions stored on a memory of the controller. It will be appreciated that vehicle operation may be adjusted by the controller based on actions performed by the controller and/or in combination with actions performed by various vehicle and engine actuators acting in concert with the controller. An example control routine is described herein with regard to FIG. 3.

FIG. 2 depicts an example embodiment of a combustion chamber or cylinder of engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10. For example, generator 58 and/or motor 56 of FIG. 1 may be coupled to the crankshaft to provide torque for engine cranking.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 62 including a throttle plate 164 may be provided along an intake passage of the engine for varying the flow rate and/or pressure of intake air provided to the engine cylinders. For example, throttle 62 may be disposed downstream of compressor 174 as shown in FIG. 2, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 170. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 170 may be an oxidation calatyst (such as catalyst 70 of FIG. 1), a three way catalyst (TWC), NOx trap, various other emission control devices, or combinations thereof. For example, emission control device 170 may be include an oxidation catalyst coupled upstream of a gasoline particulate matter filter. A muffler 178 may be included in the exhaust passage downstream of emission control device 170. As discussed in FIG. 1, during selected conditions, ionized air, generated at ionized air system 80, may be flowed into exhaust passage 148, downstream of emission control device 170 and upstream of muffler 178. Consequently, ionized air can better interact with exhaust emissions, such as engine cold-start emissions and PM emissions, in the muffler, improving the oxidation of the exhaust emissions with the ionized air. The oxidized matter can then be released along the exhaust tailpipe.

In some embodiments, an exhaust gas recirculation passage may be configured to recirculate at least a portion of exhaust gas from the exhaust passage to the intake passage. A flow of recirculated exhaust gas (EGR) may be adjusted via an EGR valve coupled to the EGR passage. The EGR passage may be configured to provide low pressure exhaust gas recirculation (LP-EGR) wherein the exhaust gas is recirculated from the exhaust passage, downstream of turbine 176 to the intake passage, upstream of compressor 174. Alternatively, the EGR passage may be configured to provide high pressure exhaust gas recirculation (HP-EGR) wherein the exhaust gas is recirculated from the exhaust passage, upstream of turbine 176 to the intake passage, downstream of compressor 174. Further still, the engine may be configured to provide LP-EGR and HP-EGR via respective passages and valves.

Exhaust temperature may be estimated by one or more temperature sensors (not shown) located in exhaust passage 148. For example, an exhaust temperature may be located downstream of emission control device 170, or muffler 178, for estimating an exhaust temperature. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing a knock or pre-ignition suppressing fluid thereto. In some embodiments, the fluid may be a fuel, wherein the injector is also referred to as a fuel injector. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different qualities, such as different compositions. These differences may include different alcohol content, different octane, different heat of vaporizations, different fuel blends, and/or combinations thereof etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; manifold pressure signal (MAP) from sensor 124, cylinder AFR from EGO sensor 128, and abnormal combustion from a knock sensor. Engine speed signal, RPM, may be generated by controller 12 from signal PIP.

Storage medium read-only memory 110 can be programmed with computer readable data representing instructions executable by processor 106 for performing the methods described below as well as other variants that are anticipated but not specifically listed.

It will be appreciated that FIGS. 1-2 show example configurations of a vehicle system with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, engine components laying in face-sharing contact with each other may be referred to as in face-sharing contact. As another example, elements positioned apart from each other with only a space there-between and no other components may be referred to as such, in at least one example.

Figure 3:
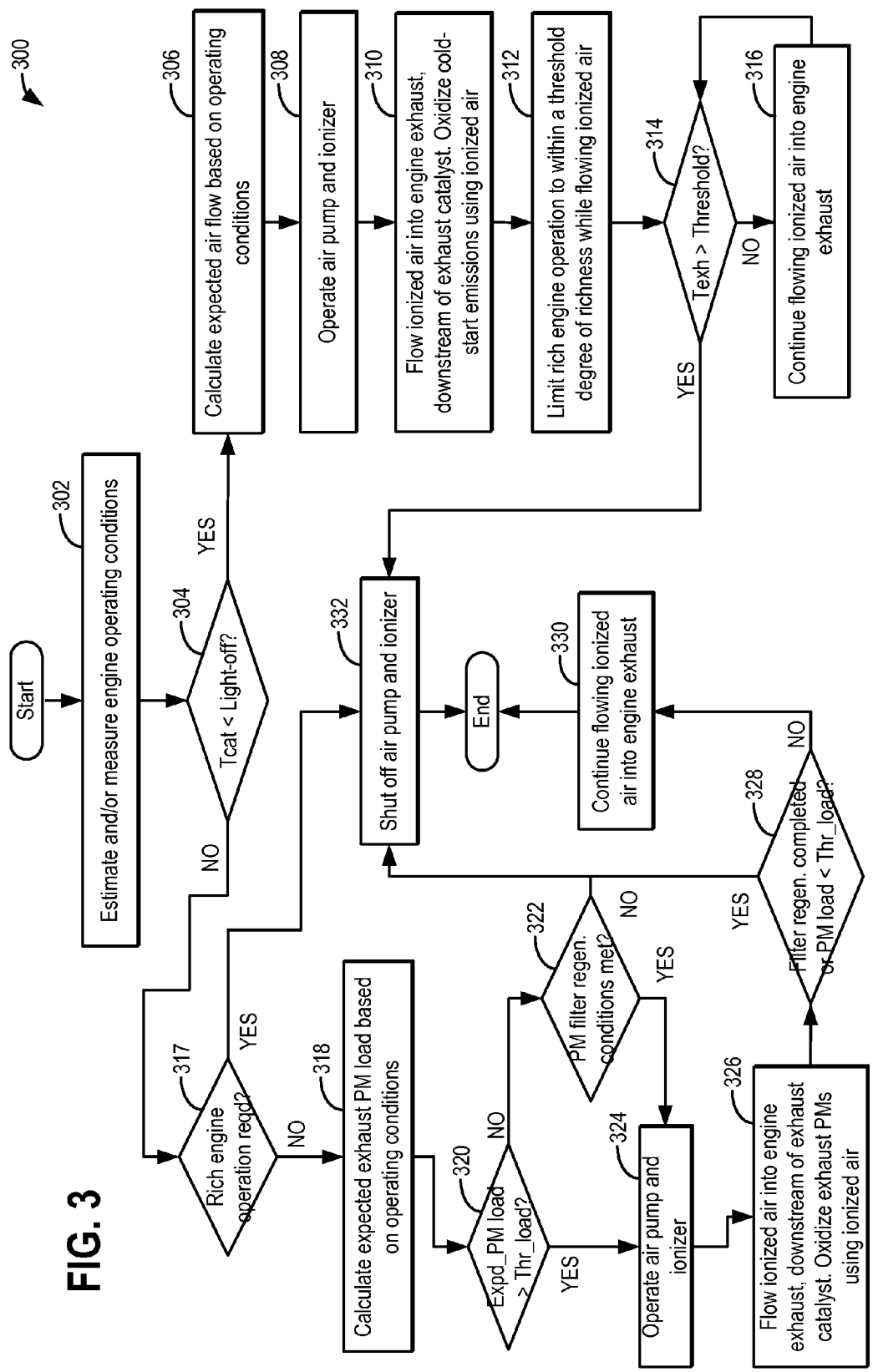
FIG. 3 shows a high level flow chart of a method for reducing engine cold-start emissions using a stream of ionized air.

Turning now to FIG. 3, an example method 300 is shown for oxidizing exhaust emissions using ionized air during selected engine operating conditions. By introducing ionized air downstream of an exhaust catalyst responsive to catalyst temperature, and further based on an exhaust PM load, engine cold-start emissions and PM emissions may be better addressed.

At 302, the method includes estimating and/or measuring engine operating conditions. The conditions estimated may include, for example, engine speed and load, operator torque demand, pedal position, boost pressure, engine temperature, exhaust temperature, ambient conditions (ambient temperature, pressure, and humidity, for example), exhaust catalyst temperature, duration (or distance) elapsed since a last engine start, vehicle mode of operation (e.g., whether the vehicle is being operated in an electric mode, engine mode, or assist mode), etc.

At 304, it may be determined if the exhaust catalyst temperature is lower than a threshold, such as lower than a light-off temperature. As such, below the threshold temperature, the exhaust catalyst may not be fully active and may not be efficient at converting exhaust emissions before their release through the exhaust tailpipe. Thus, if the exhaust catalyst is not sufficiently hot, the method includes introducing ionized air downstream of an exhaust catalyst responsive to catalyst temperature.

Specifically, at 306, the method includes determining the expected airflow to the engine based on operating conditions. For example, an air mass expected at the exhaust catalyst may be calculated based on the output of MAF and/or MAP sensors. In another example, the expected airflow may be retrieved from a look-up table wherein the airflow is stored as a function of air mass and exhaust backpressure. At 308, the method includes operating an electric air pump and an ionizer so as to replace a threshold portion of aircharge received at the catalyst with ionized air from the ionizer. For example, a flow rate of the pump may be adjusted to provide the threshold portion of ionized air. The threshold portion may be based on the catalyst temperature relative to the threshold temperature. For example, the threshold portion may be increased (by increasing the output of the pump) as the difference between the catalyst temperature and the threshold temperature increases. In one example, the output of the air pump may be adjusted so as to deliver and an amount of air from the ionizer that is 15% of the total air mass flow through the cylinders to the pipe downstream of the catalyst.

In addition to adjusting the output of the air pump, an output (e.g., power setting) of the ionizer may also be adjusted so that a threshold amount (or ratio) of air delivered by the air pump is ionized. For example, the power setting of the ionizer may be adjusted so that 20% of the air delivered by the air pump is provided as ionized air. One or more of an amount of ionized air introduced, a rate of introduction of the ionized air, and a duration of introduction of the ionized air may be based on the catalyst temperature relative to the threshold.

At 310, the method includes introducing ionized air generated at the air pump and ionizer to a location downstream of the exhaust catalyst responsive to the catalyst temperature. In addition, organic matter may be oxidized downstream of the exhaust catalyst using the ionized air. In one example, the organic matter is oxidized in a mixing chamber (e.g., a muffler) coupled downstream of the exhaust catalyst, the oxidized organic matter then released from the mixing chamber into an exhaust tailpipe. When mixed in the muffler, a better opportunity is provided for plasma interaction with the organic matter. Herein, the catalyst is an exhaust oxidation catalyst, and introducing the ionized air responsive to the catalyst temperature includes initiating introduction of ionized air when the catalyst temperature is below the threshold, continuing to introduce the ionized air until the catalyst temperature is at the threshold, and discontinuing the introduction of ionized air when the catalyst temperature is above the threshold. As will be elaborated herein, the introducing of ionized air may be further based on an estimated exhaust particulate matter load.

At 312, the method further includes, while introducing the ionized air, limiting rich engine operation to above a threshold air-fuel ratio. As one example, lambse may be limited to a value of or above 0.90. In another example, rich engine operation may be limited to within a threshold degree of richness. By limiting rich engine operation during conditions when ionized air is introduced into the exhaust, over-temperature conditions in the exhaust are pre-empted. As such, this averts exhaust component damage due to overheating.

In some examples, in addition to controlling engine combustion ratio while flowing the ionized air, an air-fuel ratio at the exhaust catalyst may be adjusted to be stoichiometric or richer than stoichiometry. For example, during an idle warm-up of the catalyst, the air/fuel ratio may be held just lean of stoichiometry or at stoichiometry. For power-enrichment, however, the air/fuel ratio may be adjusted to be rich of stoichiometry. The extent or degree of the enrichment may be limited during addition of air from the ionizer to avoid exotherms above normal levels in the exhaust pipe when the rich air/fuel mixture mixes with the ionizer air.

At 314, the method includes determining if the exhaust temperature (or the exhaust catalyst temperature) is higher than a threshold, such as higher than the light-off temperature. As the ionized air oxidizes the exhaust organic matter, heat is generated. If the exhaust is not sufficiently hot, and the exhaust catalyst is still not activated, then at 316, the method includes continuing to flow ionized air into the engine exhaust downstream of the catalyst and continuing to oxidize cold-start exhaust emissions using the ionized air. If the exhaust is sufficiently hot, and the exhaust catalyst is activated, then at 332, the method includes shutting off the air pump and disabling the ionizer, thereby discontinuing delivery of ionized air into the exhaust.

The downstream introduction of ionized air allows the exhaust catalyst (e.g., an oxidation catalyst or a three-way catalyst) to warm up near stoichiometry while extra air is added at colder temperatures to convert the residual hydrocarbons into carbon dioxide without generating NOx. In this way, the introduction of ionized air downstream of the exhaust catalyst allows emissions reduction benefits to be achieved during an engine cold-start. It will be appreciated that in alternate examples, the ionized air may be introduced upstream of the exhaust catalyst. In such an embodiment, in addition to emission reduction benefits, heating benefits may also be realized. Specifically, with upstream introduction of ionized air, to maintain the three-way catalyst at stoichiometry, the engine would need to run rich to balance the ionized air stream. While this may expedite catalyst heating, fuel economy may be affected.

Returning to 304, if the exhaust catalyst is already activated, then at 317, the method includes confirming if rich engine operation is required. In one example, rich engine operation may be transiently required for component protection, such as when turbine blades (of a turbocharger) or the exhaust catalyst approaches a threshold temperature that would degrade component life expectancy. If rich engine operation is required, then the method moves to 332 to maintain the air pump and ionizer disabled, thereby disabling delivery of ionized air into the exhaust. This maintains the downstream portion of the exhaust system within the same threshold that the catalyst requires.

If rich engine operation is not required, then at 318, the method includes calculating an expected exhaust particulate matter (PM) load based on engine operating conditions. In one example, the PM load may be determined based on the output of an exhaust soot sensor. In still another example, the PM load may be determined based on operator torque demand and pedal position. For example, during conditions when the operator torque demand is high, or during an operator pedal tip-in, the PM load of the exhaust may increase.

At 320, the method includes comparing the expected PM load to a threshold load. If the expected PM load of the engine is not higher than the threshold load, the method moves to 322 where it may be determined if regeneration conditions for an exhaust PM filter have been met. Filter regeneration conditions may be considered met if the PM load of the exhaust PM filter is higher than a threshold load.

If the expected PM load of the engine is higher than the threshold load, or if PM filter regeneration conditions are considered met, then the method proceeds to 324 to operate the air pump and the ionizer. As previously discussed, the electric air pump and the ionizer may be operated to replace a threshold portion (e.g., 15%) of aircharge received at the PM filter with ionized air from the ionizer. For example, a flow rate of the pump may be adjusted to provide the threshold portion of ionized air. The threshold portion may be based on PM load (or PM filter load) relative to the threshold load, the threshold portion increased as the difference increases. In addition to adjusting the output of the air pump, an output (e.g., power setting) of the ionizer may also be adjusted so that a threshold amount, or ratio of air delivered by the air pump is ionized, such as 20% of the air delivered by the air pump is provided as ionized air. One or more of an amount of ionized air introduced, a rate of introduction of the ionized air, and a duration of introduction of the ionized air may be based on the PM load (or PM filter load) relative to the threshold.

At 326, the method includes introducing ionized air generated at the air pump and ionizer to a location downstream of the exhaust catalyst and upstream of the PM filter responsive to the PM load. In addition, organic matter may be oxidized downstream of the exhaust catalyst using the ionized air. For example, exhaust PMs may be oxidized using the ionized air upstream of the PM filter and downstream of the exhaust catalyst. In one example, the organic matter is oxidized in a mixing chamber (e.g., a muffler) coupled downstream of the exhaust catalyst, and upstream of the PM filter, the oxidized organic matter then released from the mixing chamber into an exhaust tailpipe. Herein, the ionized air is introduced responsive to the PM load, the introduction of ionized air initiated when the PM load is above the threshold load, continuing to introduce the ionized air until the PM load is at the threshold load, and discontinuing the introduction of ionized air when the PM load is below the threshold load.

Several advantages are achieved by introducing ionized air based on the PM load. In one example, by better anticipating conditions where exhaust PM load is high, and flowing ionized air during those conditions, the exhaust PMs may be oxidized without the need to accumulate and burn-off the PMs at a later time. Thus, the need for storing the PMs on a filter is reduced. In other words, the ionized air stream can oxidize the PMs in the exhaust stream as it is produced. In one example, by delivering ionized air during high PM load conditions, the need for a PM filter in the exhaust can be obviated, providing component reduction benefits (such as reduced cost and improved packaging). In addition, the need for associated temperature and pressure sensors for filter regeneration control is reduced. Even if a PM filter is present, by flowing ionized air, the regeneration frequency of the PM filter can be reduced.

Further still, by delivering ionized air during conditions when the PM filter is loaded and needs regeneration, the filter can be regenerated at significantly lower exhaust temperatures since the ionized air stream oxidizes soot at much lower temperatures than traditional filter regeneration methods. In addition, a DFSO may not be required to regenerate the filter. By adding the ionized air downstream of the exhaust catalyst, the exhaust catalyst (e.g., a TWC) can be advantageously used to control air-fuel ratio of gaseous emissions. By maintaining the TWC near stoichiometry, emissions of hydrocarbons (HC) and NOx are minimized, allowing the output of the catalyst to be mixed heavily with ionized oxygen to reduce the particulate matter emissions. In this way, the particulate matter load can be reduced without an increase in NOx emissions, as would occur if the air stream were introduced prior to the TWC.

While introducing the ionized air, rich engine operation of the engine may be limited to above a threshold air-fuel ratio. As one example, lambse may be limited to a value of or above 0.90. By limiting rich engine operation during conditions when ionized air is introduced into the exhaust, over-temperature conditions in the exhaust are pre-empted. As such, this averts exhaust component damage due to overheating.

At 328, the method includes determining if the PM load is lower than the threshold load or if the filter has been regenerated. If not, then at 330, the method continues to flow ionized air into the engine exhaust. Else, at 332, the air pump and ionizer may be shut off, thereby disabling delivery of ionized air into the exhaust.

In this way, ionized air can be advantageously used during engine operation to expedite exhaust heating, catalyst activation, and control exhaust PM issues. By reducing the need for aggressive spark retard during a cold-start, NVH can be improved by reducing the near wide open throttle intake rumble that comes from use of aggressive spark retard. In addition, precious metal loading on the exhaust catalyst can be reduced, lowering catalyst costs.

In one example embodiment, a method for a hybrid vehicle system comprises: in response to one or more of an exhaust catalyst temperature being below an activation threshold, and an exhaust particulate matter load being higher than a threshold load, operating an ionizer to introduce ionized air downstream of the exhaust catalyst. The exhaust particulate matter load may be one of an estimated exhaust particulate matter load estimated by a soot sensor, an expected exhaust particulate matter load inferred based on engine operating conditions, and a soot load of a particulate filter coupled downstream of the exhaust catalyst. The method may further comprise, continuing operation of the ionizer until the exhaust catalyst temperature is at or above the activation threshold, or the exhaust particulate matter load is below the threshold load. Herein, the operating includes, enabling the ionizer and adjusting an output of an electric air pump coupled to the ionizer so as to add a threshold fraction of aircharge received downstream of the exhaust catalyst with ionized air.

The method may further comprise, while introducing the ionized air, limiting an engine combustion air-fuel ratio to be at or above a threshold air-fuel ratio, the threshold air-fuel ratio based one of a duration and an amount or ionized air introduced downstream of the catalyst. In addition, in response to a request for rich engine operation for engine component protection, the method may include disabling operation of the ionizer. Further still, the method may include, oxidizing exhaust organic matter, including exhaust particulate matter, in a mixing chamber coupled downstream of the exhaust catalyst, and releasing the oxidized organic matter and heat from the mixing chamber into an exhaust tailpipe.

It will be appreciated that in hybrid electric vehicles, by using ionized air to address cold-start emissions, an opportunity is provided to allow pull-downs to be longer by waiting until a colder catalyst temperature to pull-up the engine to heat the catalyst. In one example embodiment, a hybrid vehicle system comprises an engine including an intake and an exhaust, the exhaust including an oxidation catalyst; an electric air pump for flowing air into an ionizer; an ionizer for ionizing air into ionic air; an electric motor; vehicle wheels propelled via one or more of the engine and the electric motor; and a controller. The controller may be configured with computer-readable instructions stored on non-transitory memory for: during a first engine cold-start of a drive cycle, discontinuing vehicle propulsion via the motor while operating the engine with ignition timing retard to raise a temperature of the catalyst above a threshold temperature. Then, during a second, subsequent engine cold-start of the drive cycle, the controller may continue vehicle propulsion via the motor while the catalyst cools to a lower temperature. Then, while operating the engine, the controller may flow ionized air into the engine exhaust, downstream of the exhaust catalyst to reduce HC emissions at the tailpipe until the temperature of the exhaust catalyst is above the threshold temperature. In this way, emissions are maintained at low level not possible using spark retard alone on a cold catalyst.

The first engine cold-start of the drive cycle may be performed responsive to an initial drop in exhaust catalyst temperature during the vehicle propulsion via the motor, while the second engine cold-start of the drive cycle may be performed responsive to a subsequent drop in exhaust catalyst temperature while the vehicle is propelled via the motor. A drop in catalyst temperature during the first engine cold-start of the drive cycle may be to a lower temperature than the drop in catalyst temperature during the second engine cold-start of the drive cycle. Further, a particulate matter load of exhaust gas during the first engine cold-start of the drive cycle may be higher than the particulate matter load of exhaust gas during the second engine cold-start of the drive cycle. The controller may include further instructions for flowing ionized air into the engine exhaust by operating the ionizer and adjusting an output of the electric air pump based on a difference between the temperature of the exhaust catalyst and the threshold temperature.

Figure 4:
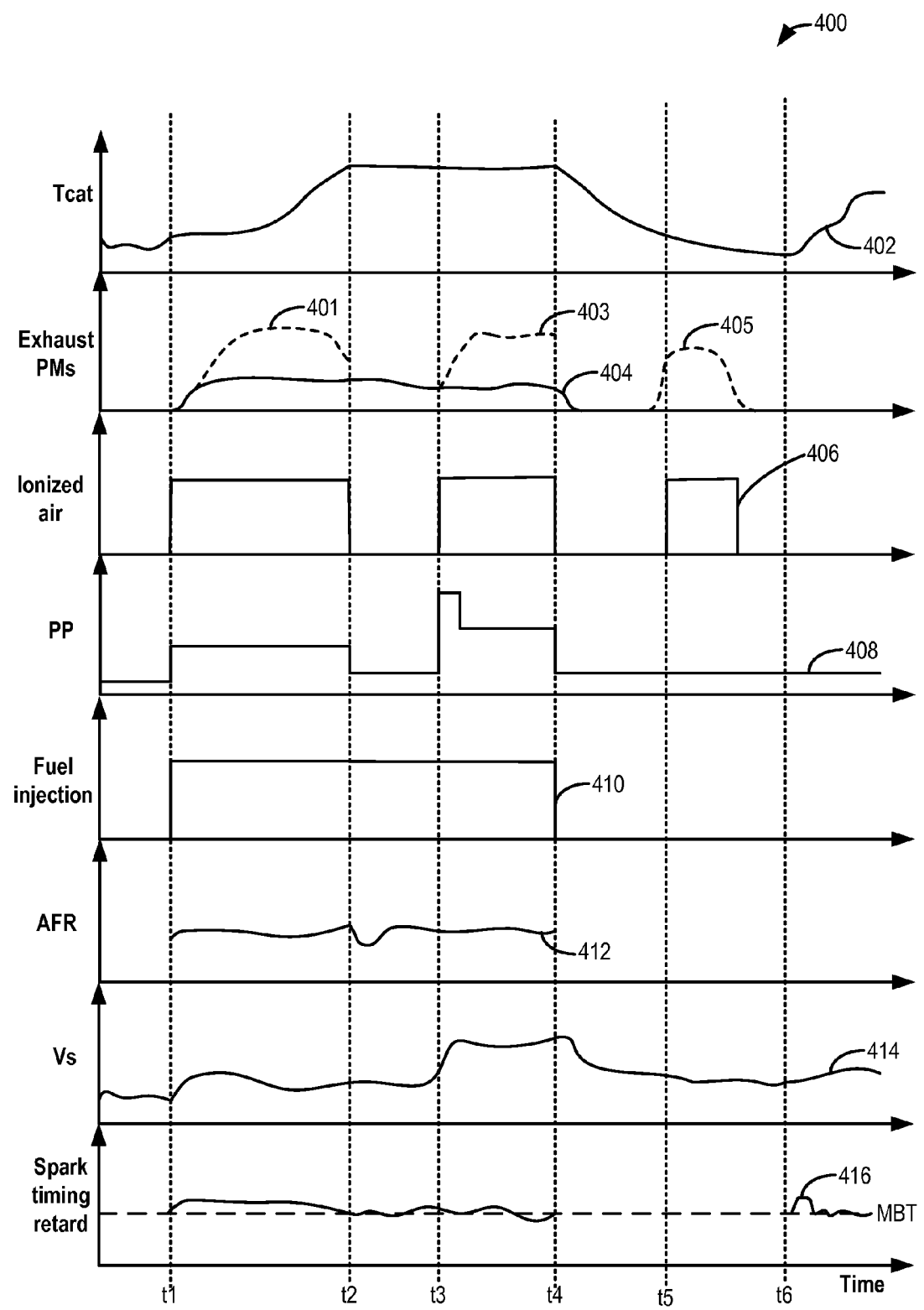
FIG. 4 shows an example engine cold-start operation using ionized air, according to the present disclosure.

Now turning to FIG. 4, map 400 depicts an example use of ionized air in an engine exhaust responsive to catalyst temperature and particulate matter load. Map 400 depicts the temperature of an exhaust catalyst at plot 402, an exhaust PM load at plot 404, flow of ionized air at plot 406, an operator pedal position at plot 408, engine fuel injection at plot 410, exhaust air-fuel ratio at plot 412, vehicle speed at plot 414, and spark timing retard (from MBT) at plot 416. In the present example, the vehicle is a hybrid vehicle that can be propelled via an engine, a motor, or both.

Prior to t1, the vehicle is operating in an electric mode with the wheels being propelled via motor torque only. No engine combustion occurs at this time, and no engine torque is generated or delivered to the wheels. At t1, the operator may tip-in to request a higher vehicle speed. To deliver to demanded torque, the engine may need to be started. Accordingly, fuel and spark are resumed in the engine to generate engine torque. However, at this time, the catalyst temperature is below its activation temperature. To reduce cold-start emissions associated with the inactive catalyst, the engine is operated with some spark retard. In addition, ionized air is flowed into the engine exhaust passage, downstream of the exhaust catalyst. In the present example, ionized air is flowed at a predefined rate, however, it will be appreciated that in alternate examples, the flow of ionized air may also be varied. By providing some spark retard from MBT, the exhaust temperature, and thereby the exhaust catalyst temperature, may be raised. By flowing ionized air concurrently, while the catalyst gets activated, untreated hydrocarbons that are not converted by the catalyst can be oxidized by the ionized air, reducing exhaust emissions. As such, if ionized air were not introduced during the cold-start, exhaust PM emissions may have been significantly higher, as shown by dashed segment 401. It will also be appreciated that by introducing ionized air during the cold-start to address the exhaust emissions, spark retard can be used less aggressively to expedite catalyst heating. In one example, between t1 and t2, spark timing may be retarded from MBT by a smaller amount and/or may be retarded for a shorter duration as compared to the spark retard usage shown at plot 416.

At t2, the catalyst may be sufficiently warm, and therefore further delivery of ionized air may be terminated. In addition, spark timing may be returned to MBT and no further spark retard may be applied for catalyst heating purposes. Between t2 and t3, the vehicle may continue to be operated with at least some engine torque. At t3, the operator may tip-in again. For example, the operator may transiently tip-in to wide open throttle. As such, during the tip-in, exhaust PM emissions may rise. To address this PM load, at t3, while the operator tips-in and exhaust soot is produced, the delivery of ionized air to the engine exhaust, downstream of the exhaust catalyst, is reinitiated. By flowing ionized air during conditions when exhaust PM levels rise, the soot can be oxidized as it is generated, averting exhaust emission degradation. Specifically, by providing ionized air when soot levels are expected to be higher, the resulting exhaust PM emissions may be rendered lower than would have otherwise been possible. For example, in the absence of ionized air delivery, exhaust PM emissions may have been higher, as shown by dashed segment 403.

At t4, operator torque demand may drop and may be at a level that can be provided via motor torque only. Accordingly, the engine may be shut down and the vehicle may be propelled via the motor only.

Between t4 and t5, as the vehicle operates with motor torque only, the catalyst temperature starts to drop. At t5, the catalyst temperature may be low enough to where exhaust PMs may be generated if the engine were operated (shown by dashed segment 405). Accordingly, at t5, ionized air may be delivered to the exhaust downstream of the exhaust catalyst, reducing exhaust PM emissions. At t6, the catalyst temperature may drop further and may now require the engine to pulled-up for catalyst heating. Accordingly, at t6, the engine is restarted and operated with spark retard to expedite catalyst heating. Herein, the engine pull-up is delayed until t6, at a cooler catalyst temperature than would have otherwise been possible. Specifically, in the absence of ionized air delivery, the engine may need to be pulled up at t5.

In another representation, over a given drive cycle, responsive to a first drop in exhaust catalyst temperature while propelling a hybrid vehicle via a motor, a controller may immediately transition to operating the engine with ignition timing retard and maintain engine operation at least until a temperature of an exhaust catalyst is above a threshold temperature. In comparison, responsive to a second, subsequent drop in exhaust catalyst temperature while propelling the vehicle via the motor, the controller may maintain motor operation while flowing ionized air into the engine exhaust, downstream of the exhaust catalyst until the temperature of the exhaust catalyst is above the threshold temperature.

In this way, each of exhaust particulate matter emissions and engine cold-start emissions can be addressed without needing to rely on fuel inefficient methods to expedite catalyst heating. The technical effect of flowing ionized air into an engine exhaust, downstream of an exhaust catalyst, is that cold-start emissions and exhaust PMs can be oxidized as they are generated, improving exhaust emissions. This not only reduces the need for exhaust particulate filters, but also the costs and controls involved with filter regeneration, such as the need for lean engine operation, additional temperature and pressure sensors, as well as the need to regenerate exclusively during DFSO operations. In addition, packaging is facilitated. Thermal issues related to filter over-activation are also reduced due to lower levels of soot accumulation. Further, cold start frequency can be reduced and therefore emissions can be addressed as they are generated without needing to expedite catalyst heating using fuel inefficient methods, such as aggressive spark retard. This also reduces the need for precious metal loading on an exhaust catalyst, reducing catalyst costs. Also, the addition of the ionized air downstream of the exhaust catalyst enables the catalyst to be operated near stoichiometry, enabling PM emissions to be reduced without causing an increase in NOx emissions. Overall, the impact on fuel economy is improved while reducing exhaust emissions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   introducing ionized air downstream of an exhaust catalyst responsive to catalyst temperature,
   wherein the catalyst is an exhaust oxidation catalyst, and wherein the introducing includes initiating introduction of ionized air when a catalyst temperature of the catalyst is below a threshold, continuing to introduce the ionized air until the catalyst temperature is at the threshold, and discontinuing the introduction of ionized air when the catalyst temperature is above the threshold.

2. The method of claim 1, further comprising, oxidizing organic matter downstream of the exhaust catalyst using the ionized air.

3. The method of claim 1, wherein the introducing includes operating an electric air pump and an ionizer so as to add a threshold portion of aircharge received at the catalyst with ionized air, the threshold portion based on the catalyst temperature relative to the threshold.

4. The method of claim 1, wherein the introducing includes operating an electric air pump and an ionizer so as to add a threshold portion of aircharge received at the catalyst with ionized air, the threshold portion based on the catalyst temperature relative to the threshold.

5. The method of claim 2, wherein the oxidizing includes oxidizing organic matter in a mixing chamber coupled downstream of the exhaust catalyst, and releasing the oxidized organic matter from the mixing chamber into an exhaust tailpipe.

6. The method of claim 1, wherein the introducing of ionized air is further based on an estimated exhaust particulate matter load.

7. The method of claim 1, further comprising, while introducing the ionized air, limiting rich engine operation to above a threshold air-fuel ratio.

8. A method for a hybrid vehicle system, comprising:
   in response to one or more of an exhaust catalyst temperature of an exhaust catalyst being below an activation threshold, and an exhaust particulate matter load being higher than a threshold load, operating an ionizer to introduce ionized air downstream of the exhaust catalyst.

9. The method of claim 8, wherein the exhaust particulate matter load is one of an estimated exhaust particulate matter load estimated by a soot sensor, an expected exhaust particulate matter load inferred based on engine operating conditions, and a soot load of a particulate filter coupled downstream of the exhaust catalyst.

10. The method of claim 8, further comprising, continuing operation of the ionizer until the exhaust catalyst temperature is at or above the activation threshold, or the exhaust particulate matter load is below the threshold load.

11. The method of claim 8, wherein the operating includes, enabling the ionizer and adjusting an output of an electric air pump coupled to the ionizer so as to add a threshold fraction of aircharge received downstream of the exhaust catalyst with ionized air.

12. The method of claim 8, further comprising, while introducing the ionized air, limiting an engine combustion air-fuel ratio to be at or above a threshold air-fuel ratio, the threshold air-fuel ratio based one of a duration and an amount of ionized air introduced downstream of the exhaust catalyst.

13. The method of claim 8, further comprising, in response to a request for rich engine operation for engine component protection, disabling operation of the ionizer.

14. The method of claim 8, further comprising, oxidizing exhaust organic matter, including exhaust particulate matter, in a mixing chamber coupled downstream of the exhaust catalyst, and releasing the oxidized organic matter and heat from the mixing chamber into an exhaust tailpipe.

* * * * *

UNITED STATES PATENT AND TRADEMARK OFFICE
CERTIFICATE OF CORRECTION

| | |
|---|---|
| PATENT NO. | : 9,677,448 B2 |
| APPLICATION NO. | : 14/689309 |
| DATED | : June 13, 2017 |
| INVENTOR(S) | : Douglas Raymond Martin et al. |

It is certified that error appears in the above-identified patent and that said Letters Patent is hereby corrected as shown below:

In the Claims

Column 18, Line 12, Claim 4, should read "The method of claim 1, further comprising, adjusting one or more of an amount of ionized air introduced, a rate of introduction of the ionized air, and a duration of introduction of the ionized air based on the catalyst temperature relative to the threshold."

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*